(No Model.)

W. WARD.
GLASS ROOF.

No. 279,465.  Patented June 12, 1883.

WITNESSES

William Ward
INVENTOR
By Leggett & Leggett
ATTORNEYS

UNITED STATES PATENT OFFICE.

WILLIAM WARD, OF CLEVELAND, OHIO.

GLASS ROOF.

SPECIFICATION forming part of Letters Patent No. 279,465, dated June 12, 1883.

Application filed April 5, 1883. (No model.)

*To all whom it may concern:*

Be it known that I, WILLIAM WARD, of Cleveland, in the county of Cuyahoga and State of Ohio, have invented certain new and useful Improvements in Glass Roofs; and I do hereby declare the following to be a full, clear, and exact description of the invention, such as will enable others skilled in the art to which it pertains to make and use the same.

My invention relates to improvements in glass roofs, but more especially to an improved manner of securing the laps or joints in glass roofs; and it consists in certain features of construction and in combination of parts hereinafter described, and pointed out in the claim.

The usual manner of constructing glass roofs is to arrange the panes of glass in rows that run up and down the roof, with the sides of the glass resting on sash, while the ends of the glass lap the one over the other—that is to say, the lower end of a pane overlapping the upper end of the next pane below it. The sides of these rows of glass are fastened to the sash by tacks, putty, or other means. Much difficulty and annoyance are liable to result from this manner of constructing a glass roof: First, some of the glass is crooked, so that the laps are open and admit much air, and even snow or rain may be driven in through these openings; second, owing to a want of stiffness in the glass, it is caused to bend and vibrate by storms beating against it, but still more by opening, closing, or otherwise adjusting the sash, as is frequently necessary in greenhouses. As a result of this vibration and bending, the fastening of the glass becomes loosened, and the panes of glass frequently slide downward more or less, leaving openings in the roof; and sometimes panes of glass slide out and fall from the roof entirely. Such accidents to a greenhouse in cold weather may be serious, especially as they may not be noticed for some time after they occur.

My invention consists of introducing between the laps of glass strips of metal bent twice at right angles, but in opposite direction, so that the strips of metal at one angle will hook onto and attach itself firmly to the top edge of one pane of glass, while the metal at the other angle gives firm support to the lower edge of the pane of glass next above.

Figure 1:
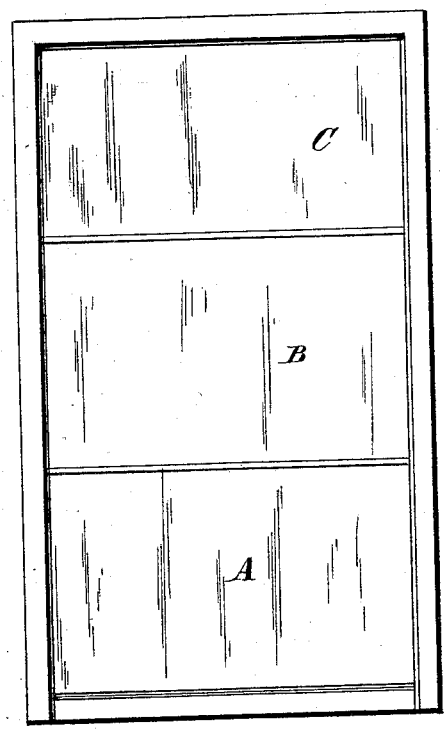
Figure 2:
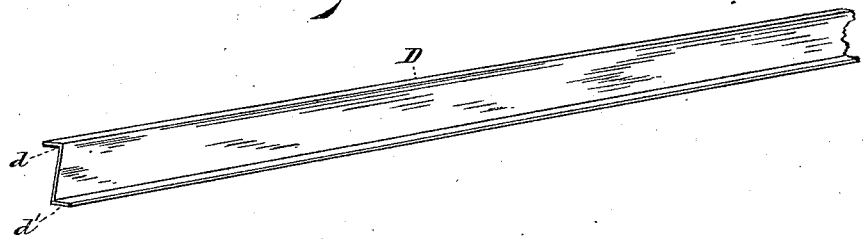

In the drawings, Figure 1 represents a section of glass roof embodying my invention. Fig. 2 is a view in perspective of a piece of sheet metal bent and made ready for use between the joints or laps of the glass.

A, B, and C represent panes of glass attached to the sash E.

D represents a strip of sheet metal, usually of tin, bent at about right angles at $d$ and $d'$.

In constructing the roof a strip like D is laid on the upper edge of the lower bar of the sash, with the hook part at $d$ overhanging and engaging the said upper edge of the bar. Next a pane of glass, A, is laid in its place in the sash, with its lower edge resting on the said strip of metal, and supported and held from sliding downward by its contact with the hook or projection upward at the angle $d'$. Next another strip is applied to the top of the pane A in the same manner as the first strip was applied to the bar below, and then the glass B is placed in position in the same manner that A was placed, and the process is continued in the same manner until the roof is completed.

Putty may be used between the strips and the glass, or the strips may be dipped in oil-paint, either of which will secure a tight roof. The glass at the sides should be fastened to the sash with putty in the usual manner. In this manner of constructing a roof each pane of glass is held in such a manner by the metallic strip below it as precludes the possibility of the glass slipping down the roof. Besides, strips of metal with angles, as described, are very stiff and support the glass sidewise and keep it from bending and vibrating, so that when the fastening of putty becomes hard it is not liable to be cracked or broken.

It is evident that a roof constructed in the manner just described will be much tighter and more durable than a roof constructed in the usual manner.

I am aware that metallic strips formed with reverse bends and of substantially the form of the letter S in cross-section have been employed for securing the adjacent ends of glass panes, said strips also being constructed to allow the sides of the panes to be overlapped, and thus the strips serve as sash for the glass roof, and hence I make no claim to such construction of parts. In my improvement the strips are formed with narrow flat flanges or ledges of sufficient width to support the edges of the glass panes, and are not intended to be bent over the surface of the panes to secure them in place.

What I claim is—

A glass roof consisting of glass panes secured at their edges to the sash, in combination with metallic strips formed with flat narrow ledges or flanges that rest against the ends of two adjacent panes, substantially as set forth.

In testimony whereof I sign this specification, in the presence of two witnesses, this 17th day of March, 1883.

WILLIAM WARD.

Witnesses:
  ALBERT E. LYNCH,
  C. H. DORER.